Sept. 21, 1948. R. A. SUTHANN 2,449,626
MAGAZINE TYPE CAMERA
Filed Oct. 4, 1946 5 Sheets-Sheet 1

ROBERT A. SUTHANN,
INVENTOR.

BY
ATTORNE

Sept. 21, 1948.     R. A. SUTHANN     2,449,626
MAGAZINE TYPE CAMERA
Filed Oct. 4, 1946     5 Sheets-Sheet 2
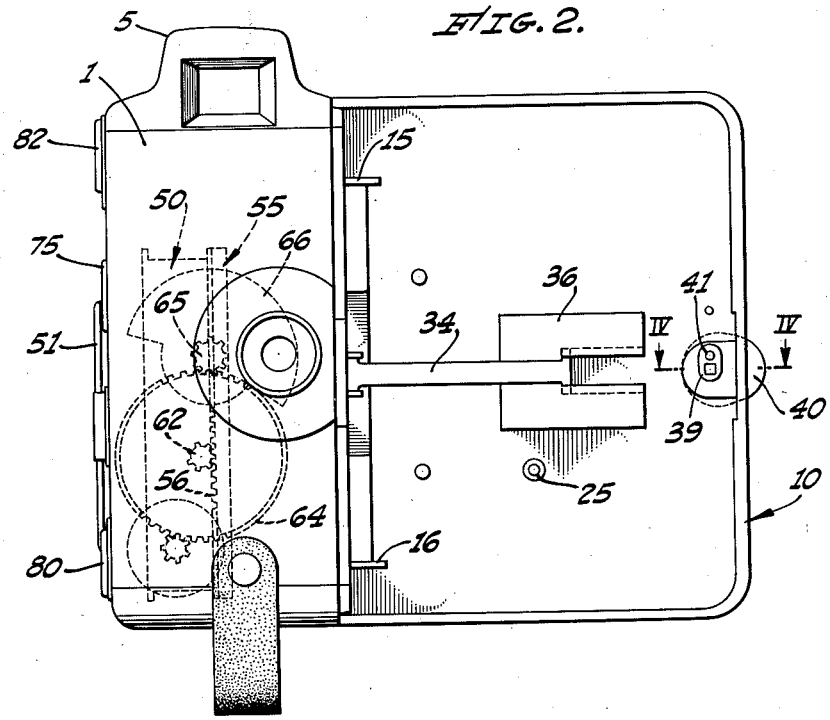
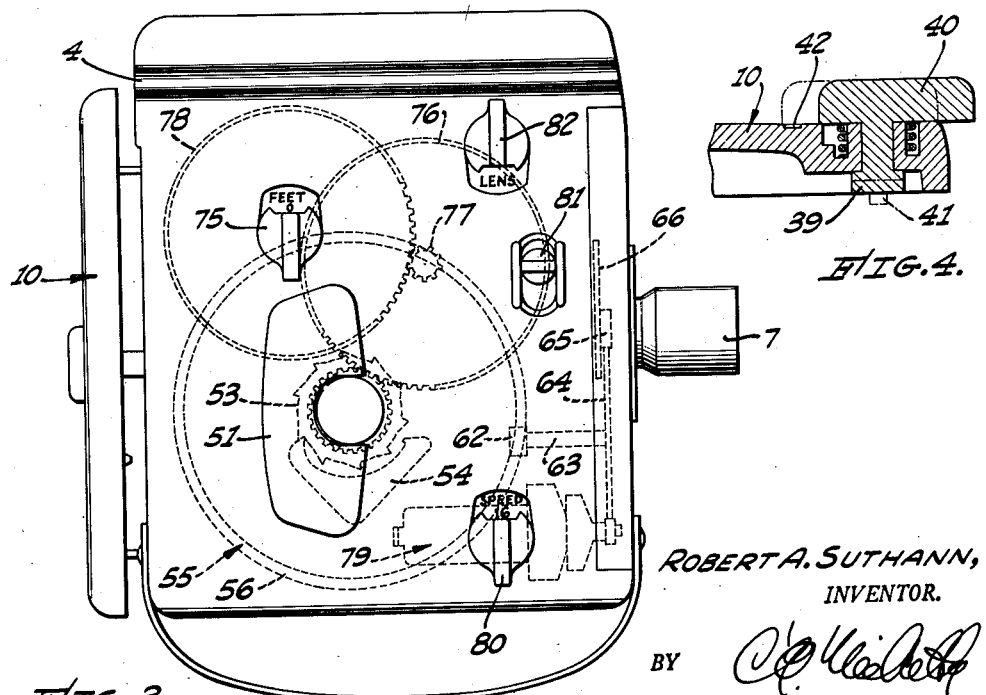
ROBERT A. SUTHANN,
INVENTOR.
BY
ATTORNEY.

Sept. 21, 1948. R. A. SUTHANN 2,449,626
MAGAZINE TYPE CAMERA
Filed Oct. 4, 1946 5 Sheets-Sheet 4

ROBERT A. SUTHANN,
INVENTOR.

BY

ATTORNEY.

Sept. 21, 1948.　　　　R. A. SUTHANN　　　　2,449,626
MAGAZINE TYPE CAMERA
Filed Oct. 4, 1946　　　　　　　　　　　　　5 Sheets-Sheet 5
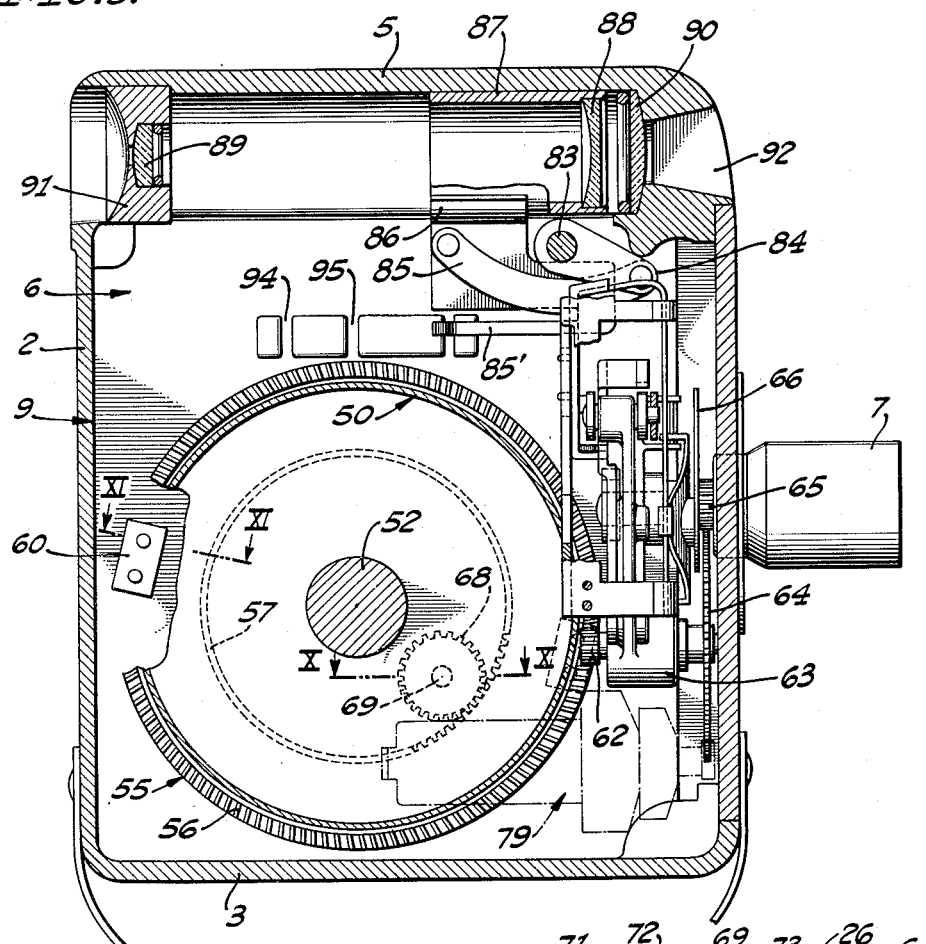
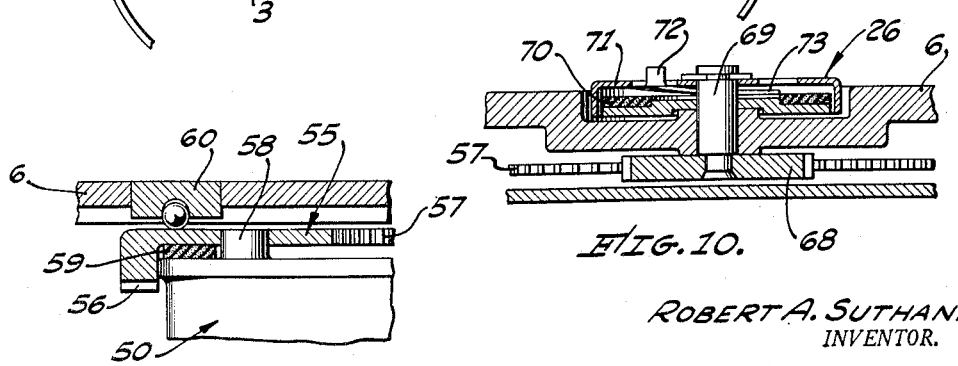
ROBERT A. SUTHANN,
INVENTOR.
BY
ATTORNEY.

Patented Sept. 21, 1948

2,449,626

UNITED STATES PATENT OFFICE 2,449,626

MAGAZINE TYPE CAMERA

Robert A. Suthann, Los Angeles, Calif.

Application October 4, 1946, Serial No. 701,106

8 Claims. (Cl. 88—17)

This invention pertains to improvements in the construction and arrangement of motion picture cameras, particularly portable cameras normally best adapted to record photographic impressions upon eight millimeter, sixteen millimeter or similar film.

One of the difficulties encountered in the past has been the proper placement and retention of a film magazine within the camera, another difficulty in the removal of a magazine from the camera. In addition, a standard type of film magazine commonly employed contains therein a masking shutter which closes the port or aperture through which light passes during exposure. Obviously, this masking shutter should not be opened until the magazine is firmly positioned within the house of the camera. The standard type of magazine also includes a spring-pressed aperture plate or backing plate which is moved into a predetermined focal plane when the magazine is in position by means of stationary lugs operatively engaging portions of the magazine when such magazine is in proper position within the camera housing.

The standard type of magazine camera employed also contains two reels with friction clutches arranged to be released by contact with lugs in the camera housing and with a take up clutch which drives the take up reel within the magazine and thereby facilitates the proper advance of the film from one reel to another within the magazine.

The present invention obviates prior difficulties and provides means whereby a magazine may be very readily inserted into a camera housing and be automatically caused to cooperatively engage the various lugs which position the pressure plate, release one of the reels and frictionally engage the clutch for driving the take up reel.

The present invention, moreover, provides means whereby the masking shutter is automatically opened whenever the magazine is in position within the house and the cover of the housing is closed. Means have also been provided whereby the masking shutter is closed whenever the cover is opened so that accidental exposure of the film within the magazine cannot take place. Means have been provided for ejecting the magazine from the camera housing whenever the cover is opened. In addition, the present invention provides a compact, simple construction in which the motor compartment and gears for driving the shutter, film advancing mechanism, take up clutch, governor, footage indicator, etc., are enclosed in a separate portion of the housing.

Moreover, the invention contemplates improvements in mounting a spring motor case and in driving the shutter and take up clutch whereby weight is materially reduced and perfect synchronization is obtained.

The invention, furthermore, contemplates a camera construction in which a view finder is employed, the view finder having some of the characteristics of a range finder and employing a tactile element for palpably indicating the distance of the observed object from the observer and the focal length of lens to be used to photograph the field of view covered by the view finder.

These and various other objects and advantages of the present invention will become apparent to those skilled in the art from the following description of an exemplary camera embodying the improved construction. In order to facilitate understanding reference will be had to the appended drawings in which:

Fig. 2 is a front view with the door in open position.

Fig. 3 is a side view.

Fig. 4 is an enlarged section taken along the plane IV—IV of Fig. 2.

Fig. 9 is a side elevation and vertical section through the motor compartment and view finder.

Fig. 10 is an enlarged section taken along the plane XX of Fig. 9 illustrating one form of take up clutch.

Fig. 11 is an enlarged section along the plane XI—XI of Fig. 9 illustrating the driving means.

Figure 1:
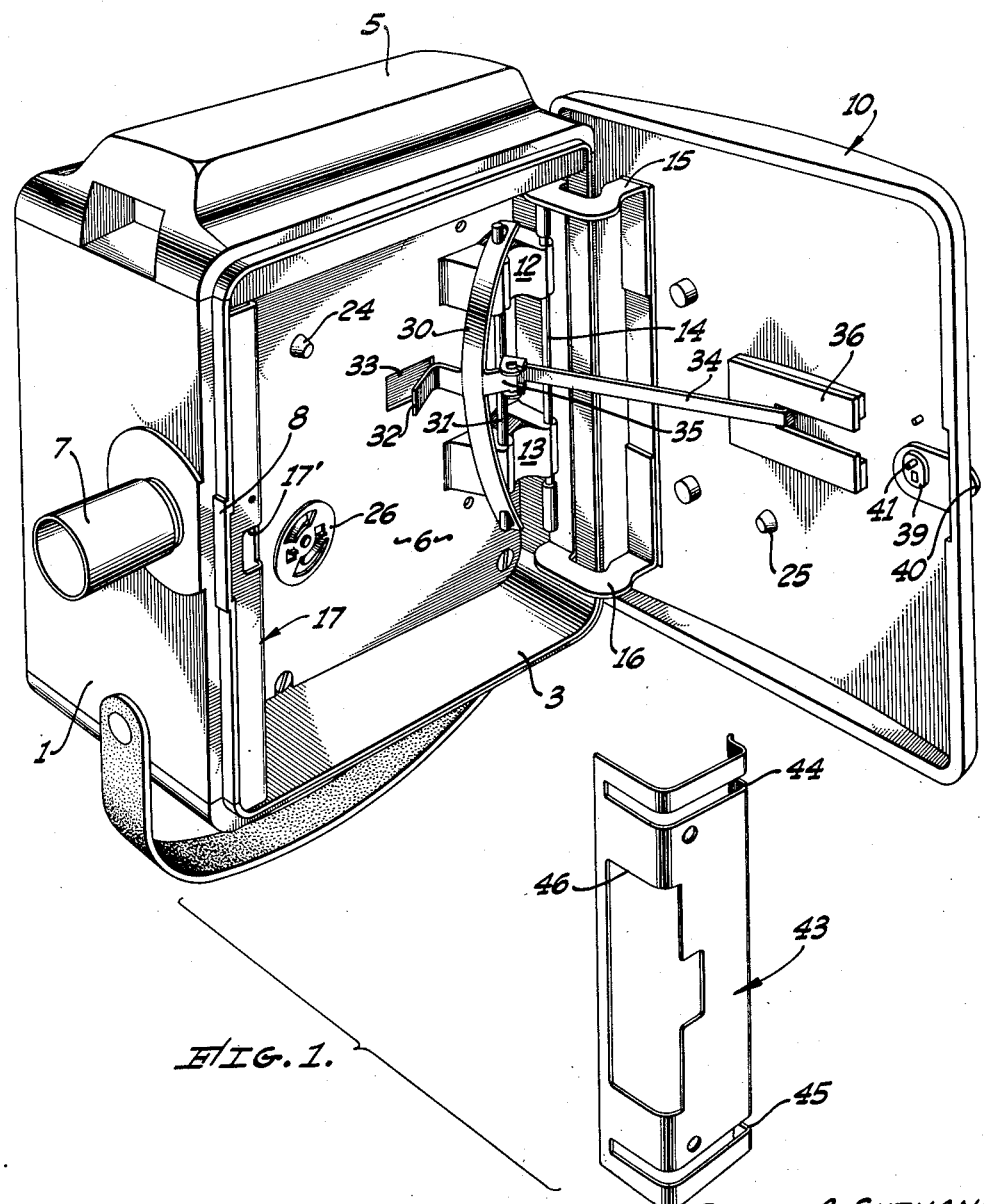
Fig. 1 is a perspective side elevational view of a motion picture camera with its cover in open position, a partition element adapted to cooperate with the hinge being shown removed.
Figure 5:
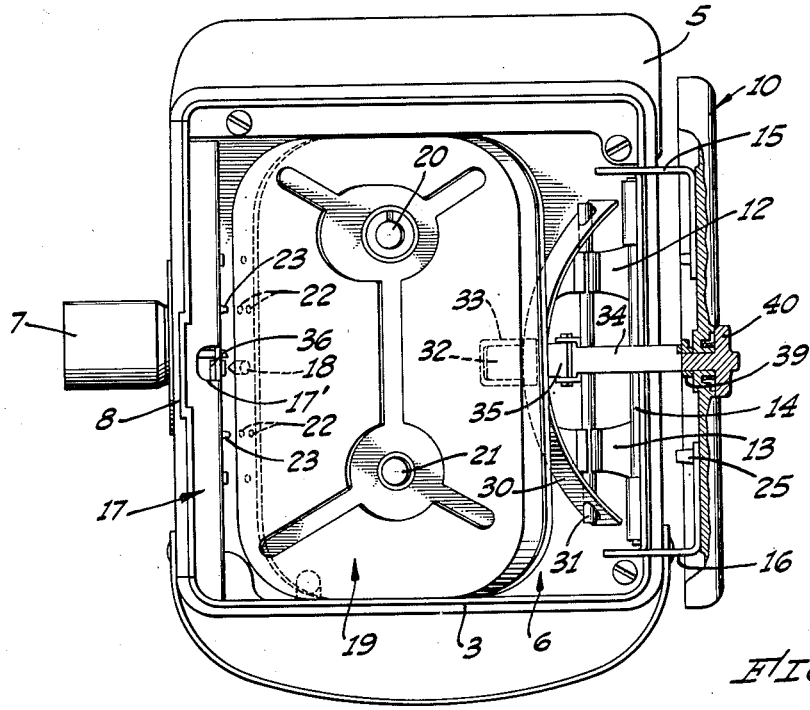
Fig. 5 is a side elevation with the cover or door open and a magazine in the process of being inserted into the camera.

The motion picture camera illustrated comprises an outer housing including front and rear walls 1 and 2, a bottom 3, a side wall 4 and a top 5. These portions of the housing may form an integral casting or molding; although in some instances it may be desirable to have the side wall 4, front wall 1, or both, removably attached to the housing. Moreover, the housing is preferably provided with a longitudinal partition 6 preferably lying in a plane parallel to the optical axis of a camera lens 7 appropriately located and attached to the front face 1 of the housing. The housing is, therefore, provided with a loading port preferably having a stepped or rabbeted edge indicated at 8, such port providing access to the magazine compartment. The partition 6 divides the housing into two sections, one of them being the outer magazine compartment whereas the inner portion indicated generally at 9 constitutes the motor compartment. The loading port is provided with a removable door 10 preferably hinged about an axis perpendicular to the axis of the camera.

In the specific form of device illustrated the partition 6 is provided with bosses 12 and 13 in which a hinge pin 14 is mounted. L-shaped hinge elements 15 and 16 suitably attached to the inner face of the door 10 are attached to the hinge pin 14 so as to permit the door 10 to swing from the open position illustrated in Figs. 1, 2, 3, 5 and 7 to a closed position, the edges of the door cooperating with the rabbeted edge 8 of the loading port so as to form a light-tight seal.

Figure 6:
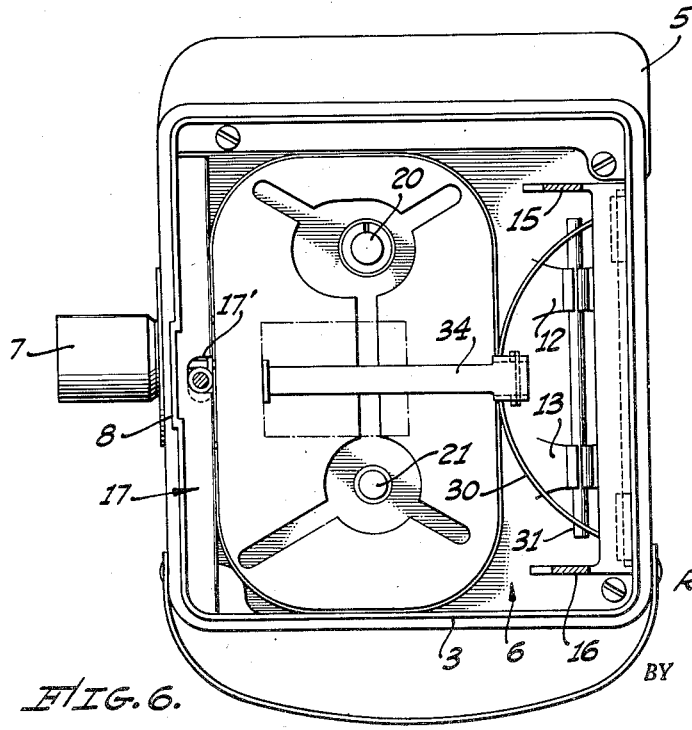
Fig. 6 is a side elevation indicating the position of the magazine when the cover is closed, the door itself having been removed for purposes of simplicity.

An aperture plate generally indicated at 17 forms the front wall of the magazine chamber and includes an opening capable of receiving the stub end of a masking shutter key 18 extending from the front face of a film magazine 19. Details of the magazine need not be shown since they are well known in the art. Suffice it to say that the magazine includes two reels central portions of which are indicated at 20 and 21, the end 20 (Fig. 6) being capable of being frictionally driven whereas the end of reel 21 on the opposite side of the magazine 19 is also capable of being frictionally driven. Within the magazine 19 but not shown is a presser plate provided with lugs extending through suitable ports in the face of magazine 19; the location of such presser plate lugs is indicated at 22 in Fig. 5. The aperture plate 17 carries lugs such as 23 capable of registering with the lugs 22 and positioning the pressure plate within the magazine 19 when such magazine is in proper position within the magazine compartment.

The partition 6 is also provided with a lug or boss 24 for cooperation with the end of reel 20 so as to release such reel for rotation. The door 10 is provided with a boss 25 for cooperation with and depression of end 21 of the lower reel in the magazine so as to permit such lower reel to be driven by a driving take up clutch 26 (Fig. 1). It will be evident that the magazine 19 must be carefully positioned and firmly pressed against the various lugs in order to properly function within the camera. In order to firmly press the magazine into position and also in order to facilitate the ejection of the magazine from the magazine compartment, means are positioned within the magazine chamber for pressing the film magazine against the aperture plate. Although such means may assume various forms, in the drawings, such means are in the form of a leaf spring 30. It will be noted that the ends of the leaf spring 30 are mounted, perforated or slotted and encircle the ends of a vertical pin 31 held between bosses 12 and 13. The bowed leaf spring 30 may be provided with a finger 32 adapted to contact the inner side of the magazine 19 while the body of spring 30 presses against the end of the magazine. The recess 33 may be formed in partition 6 to receive the finger 32 when the camera is closed.

The spring means may include a connection with the cover 10 for imparting motion to the spring. Such connecting means may include the link 34 pivotally connected to an arm 35 on the leaf spring 30, the outer end of the link 34 being provided with an enlarged head slideably retained within a gib 36 formed in the inner surface of door 10. When fully extended or opened the spring 30 is in the position indicated in Figs. 1, 5 and 7 and it will be noted that the outward movement of the spring 30 will not take place until the door 10 approaches its outermost position.

In order to make certain that the masking shutter is opened when the magazine 19 is within its chamber and closed before the door 10 is opened, the inner surface of the aperture plate 17 is provided with a rotatable element indicated at 36 provided with a squared aperture adapted to receive the masking shutter key 18. The element 36 carries an off center pin engageable in a slot of a vertically reciprocable element 37 having two spaced wings 38. The aperture plate 17 includes a port 17' capable of receiving the dog 39 mounted upon a shaft extending through the door 10, the outer end of the shaft carrying the lock arm 40. The dog 39 carries a pin 41 capable of extending between the spaced wings 38. When, therefore, the door 10 is closed, the dog 39 extends through the port 17' and the pin 41 extends into the space between wings 38. Partial rotation of the lock arm 40 causes the dog 39 to engage the edge of aperture plate 17 to hold the door in closed position and pin 41 imparts vertical movement to the element 37, such vertical movement being translated into partial rotation of element 36 and since such element is in engagement with the squared key 18 such key is turned, opening the masking shutter within the magazine 19.

It will, thus, be seen that it is impossible to open the door 10 without first moving the elements 37 and 36 so as to close the masking shutter.

In order to visually indicate the position of the lock arm 40, the word "unlocked" may be inscribed upon the outer surface of the door 10 as indicated at 42, the location of the word being such that it is obscured or covered by the lock arm 40 when the lock arm is in locked position. Since arm 40 is eccentric on the shaft, the arm extends slightly beyond the edge of the door when arm 40 is in unlocked position, thereby providing a finger grip by which opening of the door may be initiated.

The entire hinge assembly illustrated in Fig. 1 may be covered by means of a corner plate 43 provided with horizontal slits 44 and 45 through which the L-shaped hinge members 15 and 16 may extend, the leaf spring 30 and the inner portion of the link 34 extending through a larger suitable aperture 46. The cover plate 43 may be attached to the central partition 6 by suitable stud bolts or in any other suitable manner.

Mounted within the motor chamber 9 is a spring motor case 50 containing a suitable spring capable of being wound by means of an external key 51. The shaft 52 may carry a ratchet 53 and a suitable pawl 54. The rear face of the motor case 50 is provided with an annulus 55 having a flange on the outer edge thereof, such flange being provided with a crown face gear 56. This crown gear may be bevel cut. The inner periphery of the annulus 55 is provided with an internal spur gear 57. The entire annulus is shown attached to the side of the motor case 50 by means of pins or bosses 58 which transmit torque, an annulus, gasket or circular flat spring 59 of resilient or yieldable material separating the annulus 55 from the motor case Antifriction means such as the balls or rollers 60 are mounted in the partition 6 at two or more spaced points for the purpose of preventing frictional contact between the annulus and the partition 6 and tend to maintain the spring motor case 50 in a constant plane of rotation.

Figure 7:
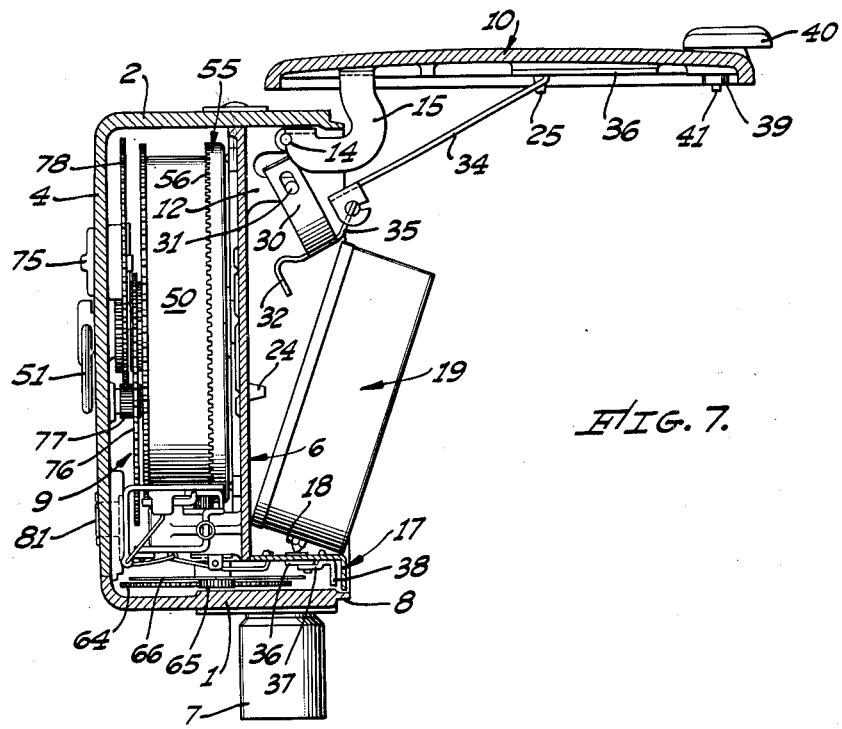
Fig. 7 is a horizontal section through the camera indicating the position of the parts when the door is open.
Figure 8:
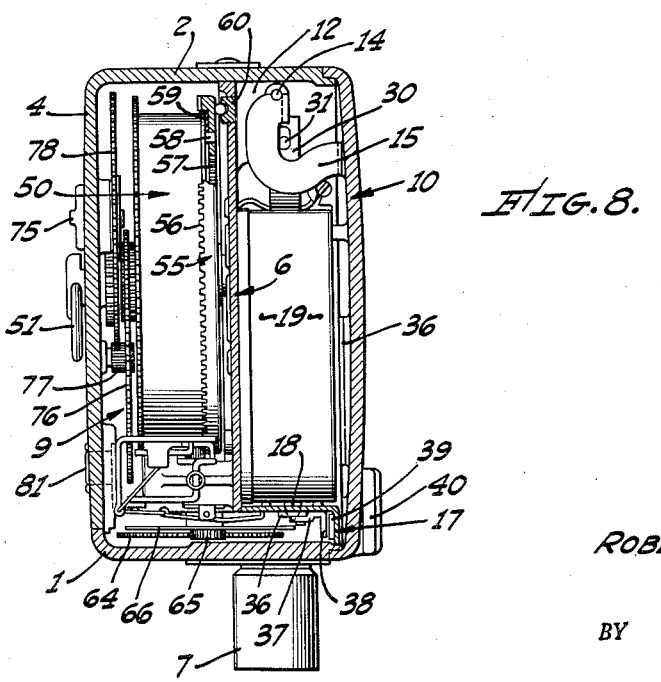
Fig. 8 is a horizontal section indicating the position of the parts when the cover is closed.

Means are provided including pinion 62, shaft 63, gear 64 and a pinion 65 in engagement therewith for driving the shutter 66 mounted upon the shaft which carries the pinion 65. This gearing extends into the space between the front face 1 and the aperture plate 17 as shown in Fig. 7.

Means are provided whereby the take up clutch 26 is driven from the internal spur gear 57, such means include the pinion 68 mounted upon a shaft 69 journaled in the central partition 6 and carrying a friction disk 70. Journaled upon the shaft 69 is an engaging element 71 provided with a tooth or dog 72 and a spring means 73 bearing against the friction disk 70. When the magazine 19 is pressed against the friction clutch 26 the tooth 72 engages an appropriate element on the reel 21 driving such reel so as to take up the film in the magazine. Friction drive is attained through the intervention of spring 73 and friction disk 70 so that undue strain is not imposed upon the film within the magazine.

In addition the motor case 50 drives a footage indicator generally indicated at 75 and carried by the side 4 by means of a gear train including gear mounted upon the motor case, gear 76, pinion 77 and gear 78 (Fig. 3). It may also be noted that gear 64 may also drive a speed governor generally indicated at 79 capable of being set by an adjustment 80 also carried by the side 4 of the camera housing. Control means for starting and stopping the motion of film and for varying the film advancing mechanism may also be carried upon the side 4 as indicated at 81.

The side 4 may also carry a means for adjusting a view finder and palpably indicating the distance of an observed object. Such means may comprise a rotatable lever 82 mounted upon a shaft 83 extending into the camera housing (see Fig. 9). Shaft 83 may also carry a lever 84 pivotally connected by means of a link 85 with a saddle 86 carrying a tubular element 87 slidable in a direction parallel to the optical axis of the lens 7 within the upper portion of the housing and preferably within a protuberance formed in the top 5. The tubular element 87 may carry a lens 88 constituting a movable element of an optical system including a lens 89 and a lens 90 firmly positioned within the housing and in alignment with a recess 91 and an aperture 92, the aperture 92 having the proportions of the field of view capable of being recorded upon the film in the magazine 19.

The partition 6 may have on its surface a plurality of ridges or ribs or a series of depressions such as 94, 95, etc., separated by bosses. The link 85 is preferably provided with a tactile element 85' having a round end portion adapted to slidably move from one recess into another of the aforesaid series and over the intervening bosses.

Different fields of view are embraced by the view finder at various positions of movable element 88, these positions being correlated by recesses 94, 95, etc., with similar field of view attained by use of correlated camera lenses which may be substituted for lens 7.

The recesses, bosses, tactile element 85' and view finder lens system are so proportioned that the operator may, by rotating the adjustment member 82 palpate the instrument and sense the setting of the movable lens element 85 and thereby be informed by the sense of touch as to which photographic lens to use to photograph the objects in the view finder.

It is to be understood that not all of the improvements described herein need be employed at the same time. Many changes, modifications and adaptations may be made; all changes coming within the scope of the appended claims are embraced thereby.

I claim:

1. A portable motion picture camera including a housing provided with a magazine chamber having a bottom, top, end walls and one side wall, the other side wall being open to provide a loading port, an aperture plate within and carried by one end wall of said magazine chamber, a cover for said loading port hinged to the other end of the chamber opposite the aperture plate, a vertical pin adjacent the hinge of said cover and means, within the magazine chamber for pressing a film magazine against the aperture plate, said means including a bowed leaf spring provided with apertured ends mounted upon the vertical pin for partial rotation thereon, the ends of said spring being longitudinally movable along said pin, and a lateral finger, integral with the spring arranged to contact a side of a magazine within the chamber to eject such magazine upon movement of the spring from its normal position.

2. A portable motion picture camera in accordance with claim 1, wherein means is provided for moving the said leaf spring about its vertical axis, said means including a lost-motion means connecting the said spring with the said cover, whereby the ejection of said magazine is delayed until said cover approaches its open position.

3. In a portable motion picture camera, a housing therefor having one open side, a longitudinal partition in said housing providing a magazine chamber adjacent said open side, a photographic objective and an apertured plate carried by one end of said housing, means positioned within the said magazine chamber and adjacent the other end of said housing for turnably supporting a cover for said open side and for turnably supporting a leaf spring for pressing a film magazine against the said apertured plate, the said means for turnably supporting said cover and said leaf spring being carried by said partition.

4. A portable motion picture camera in accordance with claim 3, wherein the said leaf spring is provided with means for ejecting a magazine upon movement of said spring from its normal position, a recess in said partition for receiving the said ejecting means when the latter is in non-ejecting position.

5. A portable motion picture camera in accordance with claim 3, wherein a lost-motion means is provided for actuating the said leaf spring, the said lost-motion means including a connection between the said leaf spring and said cover, whereby the said leaf spring is maintained in its normal position until the said cover approaches its full open position.

6. A portable motion picture camera including a housing having one open side, a cover for said open side, a longitudinal partition in said housing dividing the same into two chambers, a magazine in the chamber adjacent said open side, an apertured plate carried by one end of said magazine chamber and means carried by the other end of said magazine chamber for pressing a film magazine against said apertured plate, the said means including a leaf spring mounted for movement about a vertical axis, the last said means including means for mounting said cover about a vertical axis, and a lost-motion means between said cover and said spring for moving the latter about its axis.

7. A portable motion picture camera in accordance with claim 6, wherein the said spring means includes a magazine-ejecting means and a recess in the said partition for receiving the said ejecting means when the said spring is in normal pressing position.

8. A motion picture camera including a housing having one open side, a cover for said open side, an apertured plate positioned within said housing and carried by one end thereof, and means positioned within said housing and mounted adjacent the other end thereof for pivotally supporting the said cover about a vertical axis, means including the said cover-supporting means for pivotally supporting a leaf spring, lost-motion means connecting said leaf spring with said cover for moving the said spring against a film magazine for pressing the latter against the said apertured plate, magazine-ejecting means carried by said spring and operable in response to the said lost-motion means as the said cover approaches its fully open position.

ROBERT A. SUTHANN.

REFERENCES CITED

The following references are of record in the file of this patent:

UNITED STATES PATENTS

| Number | Name | Date |
|---|---|---|
| 2,028,608 | Howell | June 21, 1936 |
| 2,080,021 | Wittel | May 11, 1937 |
| 2,113,182 | Scheibell | Apr. 5, 1938 |
| 2,153,220 | Wittel | Apr. 4, 1939 |
| 2,165,362 | Fairbanks | July 11, 1939 |
| 2,183,529 | Fairbanks | Dec. 19, 1939 |
| 2,241,231 | Wittel | May 6, 1941 |
| 2,322,400 | Sperry | June 22, 1943 |
| 2,322,401 | Sperry et al. | June 22, 1943 |
| 2,341,410 | Mihalyi | Feb. 8, 1944 |
| 2,342,511 | Gaty | Feb. 22, 1944 |
| 2,353,565 | Kaprelian | June 11, 1944 |
| 2,366,153 | Sperry | Dec. 26, 1944 |
| 2,377,821 | Sperry et al. | June 5, 1945 |